United States Patent [19]

Huber et al.

[11] 4,275,341
[45] Jun. 23, 1981

[54] ELECTRONIC POWER SUPPLY CIRCUIT FOR A SERIES CONNECTED DC MOTOR

[75] Inventors: André Huber, Le Vésinet; Alain Muller, Chilly-Mazarin; Jacques Soffer, Sceaux, all of France

[73] Assignee: Alsthom-Atlantique, Paris, France

[21] Appl. No.: 105,336

[22] Filed: Dec. 19, 1979

[30] Foreign Application Priority Data

Dec. 22, 1978 [FR] France .................................. 78 36138

[51] Int. Cl.³ .............................................. H02P 3/14
[52] U.S. Cl. .................................... 318/376; 318/375; 318/362; 318/370; 318/273
[58] Field of Search ............... 318/375, 376, 362, 370, 318/269, 273, 246, 248

[56] References Cited

U.S. PATENT DOCUMENTS

| | | | |
|---|---|---|---|
| 3,188,547 | 6/1965 | Zelina | 318/370 |
| 3,309,594 | 3/1967 | Belt et al. | 318/246 |
| 3,826,962 | 7/1974 | Morton et al. | 318/376 |
| 3,828,233 | 8/1974 | Brulard | 318/376 X |
| 3,973,176 | 8/1976 | Rohsler | 318/269 |

*Primary Examiner*—Ulysses Weldon
*Attorney, Agent, or Firm*—Sughrue, Rothwell, Mion, Zinn and Macpeak

[57] ABSTRACT

The circuit effects a changeover from the traction configuration to the braking configuration or vice-versa in less than one millisecond. It includes the field winding (3) of the motor (1) disposed between a traction thyristor (12) and a main chopper (13) followed by a traction diode (14) and the armature of the motor, the field winding being in parallel with a free-wheeling diode (D5) and a shunt thyristor (THS).

2 Claims, 2 Drawing Figures

ELECTRONIC POWER SUPPLY CIRCUIT FOR A SERIES CONNECTED DC MOTOR

FIELD OF THE INVENTION

The present invention relates to an electronic circuit for supplying current to a series-excitation DC motor, which effects a virtually instantaneous change over from the motor traction configuration to the generator braking configuration and vice-versa without requiring electromechanical equipment.

BACKGROUND OF THE INVENTION

It is known that the transition between traction and braking can be caused by either reversing the polarities at the terminals of the armature or by reversing the armature current in which case the direction of the polarities at the terminals of the motor remains the same, as does the flux in the main terminals. To effect the transition, it is therefore necessary to reverse the armature current with respect to the flux generated by the inductor.

Traction motors are supplied with current either via a starter rheostat or via an electronic circuit which includes a chopper whose firing and excitation are controlled. Up till now, it has been necessary to verify that the motor current has been cancelled before permitting a traction-to-braking transition (or vice-versa) since the transition, effected via contactors (or thyristors inserted directly in the motor circuit) could take place only when the motor current had been cancelled. In conventional systems, the transition is effected after a delay of three or four seconds.

The aim of the present invention is to design an entirely electronic circuit for supplying electricity to a series excitation motor in which circuit an instruction for transition from traction to braking or from braking to traction is performed virtually immediately (the delay being about one millisecond).

SUMMARY OF THE INVENTION

The present invention constitutes an electronic circuit for supplying current to a series-excitation DC motor, characterized in that it includes, between a positive terminal and a negative terminal of a source of electricity: a first branch circuit which includes, in order, a traction thyristor, the field winding of said motor, said winding having, in parallel with its terminals, a first free-wheeling diode and a shunt thyristor connected in a head to tail configuration, a main chopper, a traction diode, the armature of said motor and, in parallel with said traction diode and said armature, a braking thyristor, the anodes of said thyristors, of said chopper and of the traction diode being at the ends nearest said positive terminal. The circuit further comprises a second branch circuit which includes, in order, a regeneration diode and a second free-wheeling diode. Further, the cathodes of said regeneration diode and of said free-wheeling diode are on the end nearest said positive terminal and the anode of the regeneration diode is connected firstly to the cathode of said traction diode and secondly to the cathode of said traction thyristor via a braking diode whose anode is connected to the anode of said regeneration diode.

The invention will be better understood from the example given hereinafter with reference to the accompanying drawings.

DESCRIPTION OF THE PREFERRED EMBODIMENT

Figure 1:
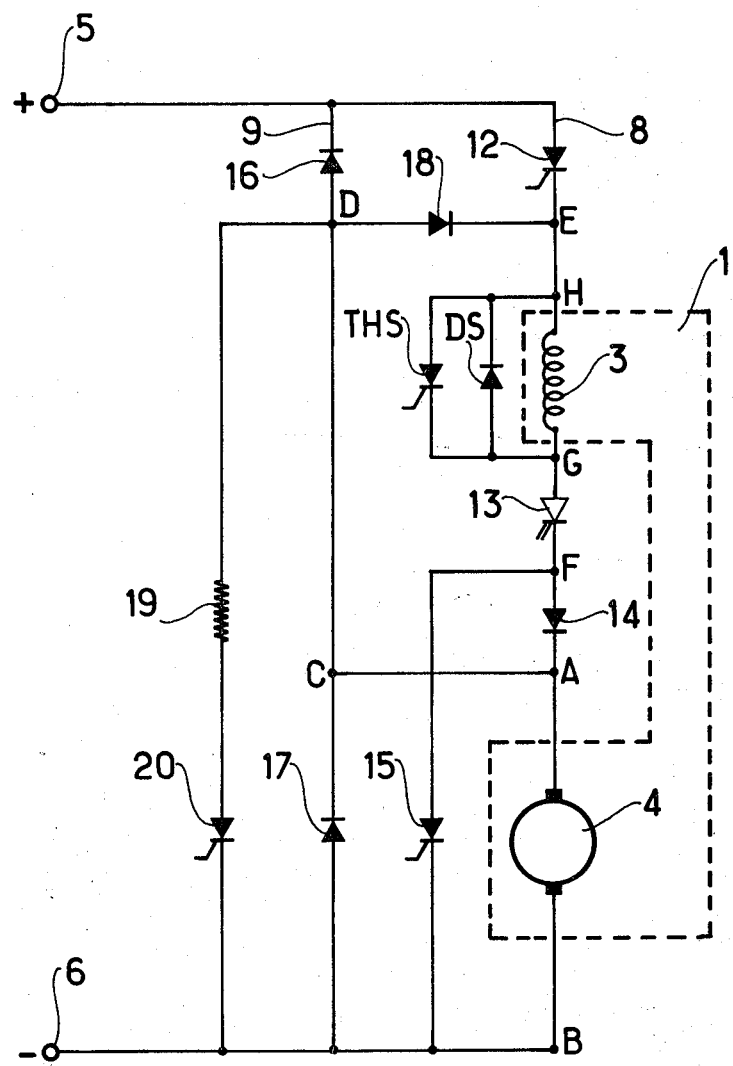
FIG. 1 is a diagram of the electronic circuit in accordance with the invention.

FIG. 1 illustrates a supply circuit for a series-excited DC motor, shown generally in dotted line fashion at 1 which includes a field winding 3 in series with the armature 4 of the motor. The motor 1 operates in drive mode when it is used as a traction motor and in generator mode when it is used for braking. In both cases, current flows through the winding 3 in the same direction. In contrast, the current must flow through the armature 4 in one direction in the case of use as a traction motor and in the opposite direction in the case of use for braking.

A positive terminal 5 and a negative terminal 6 are connected to a supply line to supply the potential which is used to power the motor driven as a traction motor or, on the contrary, to return the energy which comes from the motor 1 driven as generator in the case of regenerative braking.

A first branch circuit 8 and a second branch circuit 9 are parallel-connected between the terminals 5 and 6. The first branch circuit 8 comprises a series connection traction thyristor 12 whose anode is connected to the terminal 5 and whose cathode is connected to a point referenced E which is itself connected to a point H which is one of the ends of the field winding 3; the winding itself is parallel with a free-wheeling diode DS and a thyristor THS which are connected head-to-tail, the thyristor THS being disposed in the same direction as the traction thyristor 12; then the main chopper 13 whose main thyristor is disposed in the same direction as the traction thyristor 12; then a traction diode 14 disposed in the same direction as the traction thyristor 12 and connected from the main chopper 13 by a common point F; and finally the armature 4 of the motor 1. The point A is the point common to the traction diode 14 and the armature 4. Point B is the terminal of the armature 4 which is connected to the negative terminal 6. A connection which includes a braking thyristor 15 whose anode is connected to F is connected in parallel with first branch portion FB.

The shunt thyristor THS is intended to short-circuit the winding 3 so as to reduce the excitation of the motor 1 and consequently to increase its speed. The shunt thyristor THS is turned off when the main chopper 13 is turned off.

The shunt thyristor THS is used in the case of complete non-conductivity of the main chopper 13. In the case of 100% conduction of the main chopper 13, the shunt thyristor THS must be replaced by a second chopper.

The second branch circuit 9 comprises a regeneration diode 16 and a free-wheeling diode 17 whose cathodes are towards the positive terminal 5 end.

Two points C and D are disposed in the connection between the cathode of the free-wheeling diode 17 and the anode of the regeneration diode 16, the point C being connected to the point A of the first branch circuit 8 and the point D being connected to the anode of a braking diode 18 whose cathode is connected to the point E of the first branch circuit 8.

The system described up to this point allows the motor to be used for traction and for regenerative braking. For dynamic braking, braking resistors 19 in series with a dynamic braking thyristor 20 can be added between the point D and the terminal 6.

Operation is as follows:

In all cases, whether using the motor for traction or for braking, the current in the field winding 3 of the motor always flows in the same direction and supply thereof is controlled by the thyristor THS and the free-wheeling diode DS.

In the traction case, the traction thyristor 12 receives firing pulses on its trigger electrode while the braking thyristor 15 does not receive any. The main chopper 13 receives successive orders to allow the current to pass or to stop the current. The shunt thyristor THS receives or does not receive firing pulses. When the motor is used for traction, the main chopper 13 is turned on, the current comes from the terminal 5, passes via the traction thyristor 12, the series winding 3, the chopper 13, the traction diode 14 and the armature 4 of the motor to close at the terminal 6.

It is observed that in the armature 4, the current flows in the direction A to B. Again when the motor is used for traction, when the main chopper 13 is turned off, the traction thyristor 12 is turned off, as is the shunt thyristor THS (if it was previously on). There can be no sudden current interruption either in the armature 4 or in the winding 3; the respective currents tend to decrease and a circuit is provided to loop them back to their own sources via the free-wheeling diode 17 and the free-wheeling diode DS respectively.

In the case of regenerative braking, the braking thyristor 15 receives firing pulses on its trigger electrode and the traction thyristor 12 does not receive any on its. The main chopper 13 receives orders to allow the current to pass or to block it and the shunt thyristor THS receives or does not receive firing pulses.

During regenerative braking, the main chopper 13 is off; the current which comes from the terminal 6 flows through the armature 4 of the motor in the direction from B to A, then through the connections AC and CD, then through the regeneration diode 16 before ending at the terminal 5. Thus, the regeneration current flows in the opposite direction in the armature while the current of the winding 3 continues to flow in the same direction from H towards G with its loop being closed by the free-wheeling diode DS.

During regenerative braking, the main chopper is on; the motor is short-circuited and the current of the armature flows from B to A, passes via C, D, the braking diode 18, E, the winding 3, the chopper 13, F, and the braking thyristor 15, closing the circuit at B. When the current has reached a sufficient value, the chopper 13 is turned off, the current is consequently cancelled in the braking diode 18 and the braking thyristor 15 and flows again at the required value in the regeneration diode 16, while the current of the winding 3 loops through its free-wheeling diode DS.

In the case were the equipment cannot regenerate in the line, the dynamic braking resistor 20 is fired. Then, the current which comes from the armature of the motor follows the path A, C, D, resistor 19 and thyristor 20 and completes its circuit at B.

The change from traction to braking is almost instantaneous, since as soon as the chopper 13 is turned off, the traction thyristor 12 and the shunt thyristor THS (in the case where it was previously on) are turned off and only about 1 ms later, the chopper 13 and the braking thyristor 15 can be turned on and will be conductive as soon as the current in the armature 4 is reversed. No particular precaution needs to be taken (other than waiting for 1 ms) since the traction thyristor 12 prevents braking.

The change from braking to traction is also rapid; the braking thyristor 15 is blocked by the chopper 13 and consequently, 1 ms later, the change to traction can begin. Traction will be effective as soon as the braking current is cancelled.

The principle of locking between the traction thyristor 12 and the braking thyristor 15 is identical to that described in French patent application No. 77 23 430, so as to avoid the same type of short-circuit between the terminals 5 and 6, in the case where the shunt thyristor THS in on.

Figure 2:
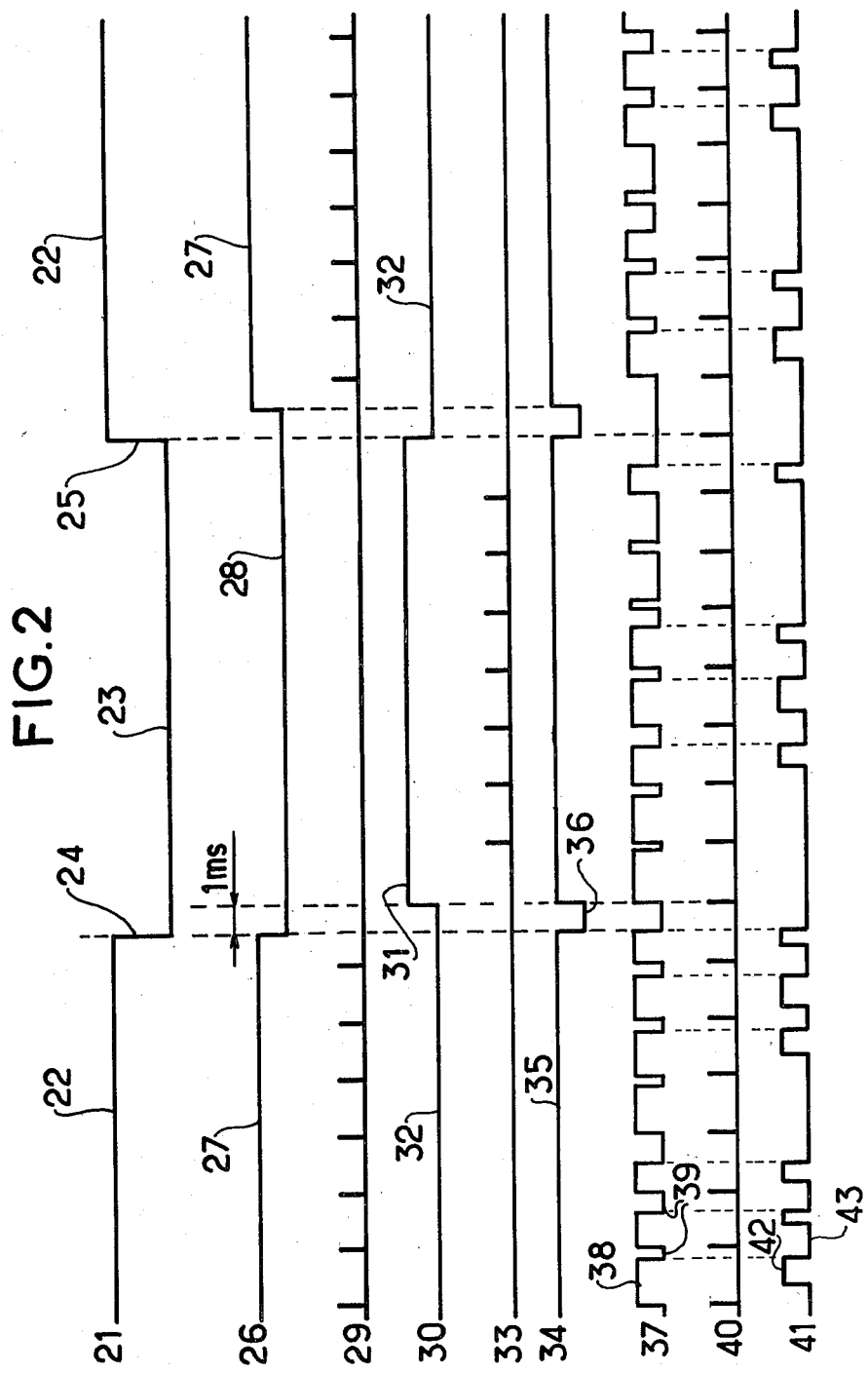
FIG. 2 shows graphs of the various orders sent to the controlled components, as well as the states of these components.

Graph 21 in FIG. 2 illustrates the traction state (upper level 22) and the braking state (lower level 23); the discontinuity 24 in the graph represents the order to change to braking; the discontinuity 25 in the graph represents the order to change to traction.

The upper level 27 of graph 26 represents the order to fire the traction thyristor 12 and the lower level 28 of of the graph represents the inhibition to firing the traction thyristor 12.

Graph 29 illustrates the firing pulses sent to the trigger of the traction thyristor 12. The upper level 31 of graph 30 represents the braking thyristor 15 having its firing enabled and the lower level 32 of the graph represents the braking thyristor 15 having its firing inhibited.

The pulses 33 represent the firing pulses sent to the trigger of the braking thytristor 15.

The upper level 35 of graph 34 represents main chopper 13 turn-on enablement and its lower level 36 represents main chopper 13 turn-on inhibit. The duration of 36 is about one millisecond. This enables a change-over from traction to braking or from braking to traction.

Reference 37 represents the "on" state of the main chopper 13. The upper level shows that the chopper 13 is on; the lower level 39 shows that the chopper 13 is off.

The pulses 40 are clock pulses spaced one to three milliseconds apart and used for controlling the turning on of the main chopper as well as the synchronization of the pulses 29 and 33.

Reference 41 represents the "on" state of the bridging thyristor THS. The upper level 42 means that the thyristor THS is on; the lower level 43 means that the thyristor THS is off. It can be observed that the thyristor THS is turned off at the same time as the main chopper 13.

It can be fired at the same time as the main chopper or later, or not receive any firing order while the main chopper is being fired.

The beginning of the "on" inhibition state 36 of the main chopper 13 is controlled by the order 24 to change to braking or by the order 25 to change to traction. The end of the "off" state 39 of the chopper 13 cannot be controlled by the pulse 40 if that pulse is generated during the gating pulse 36.

The braking thyristor 15 is fired on only two conditions: when its trigger receives the order to fire it and when the main chopper 13 is on. It is on only during braking.

The traction thyristor 12 is also fired only in these two conditions. It is on only during traction.

The circuit in accordance with the invention also has the great advantage of providing a looping path for the current supplied to the motor whatever its operation state may be, via the free-wheeling diodes 17 and DS during traction and via the regeneration diode 16 during braking. Therefore, there is no danger of voltage surges due to a sudden interruption of the supply circuit.

We claim:

1. An electronic circuit for supplying current from a source of electricity to a series-excitation DC motor, said DC motor including a field winding and an armature, said circuit comprising between a positive terminal (5) and a negative terminal (6) of said source of electricity:

a first branch circuit (8) which includes, in series, a traction thyristor (12), the field winding (3) of said motor, a main chopper (13), a traction diode (14), the armature (4) of said motor, and wherein said winding has, in parallel with its terminals a first free-wheeling diode (DS) and a shunt thyristor (THS) connected in a head to tail configuration, and wherein a braking thyristor (15) is in parallel with traction diode (14) and said armature (4) and the anodes of said traction and shunt thyristors (12, THS), of said chopper (13) and of the traction diode (14) face said positive terminal (5); and a second branch circuit (9) which includes, in series, a regeneration diode (16) and a second free-wheeling diode (17), and wherein the cathodes of said regeneration diode (16) and of said free-wheeling diode (17) face said positive terminal (5), and wherein the anode of the regeneration diode (16) is connected firstly to the cathode of said traction diode (14) and secondly to an anode of a braking diode (18) and wherein the cathode of said braking diode (18) is connected to the cathode of said traction thyristor (12).

2. An electronic circuit according to claim 1, wherein said second branch circuit (9) includes, in parallel between a common point of the anode of said regeneration diode (16) and the anode of said braking diode (18) and said negative terminal (6) a connection which links a braking resistor (19) to a dynamic braking thyristor (20) whose cathode is connected to said terminal (6) of negative polarity.

* * * * *